Sept. 15, 1931.    A. CHABROL    1,822,882

DIRIGIBLE HEADLIGHT

Filed Oct. 9, 1929

Alphonse Chabrol
INVENTOR;

By Otto Munk
his Attorney.

Patented Sept. 15, 1931

1,822,882

UNITED STATES PATENT OFFICE

ALPHONSE CHABROL, OF AIXE-SUR-VIENNE, FRANCE

DIRIGIBLE HEADLIGHT

Application filed October 9, 1929, Serial No. 398,287, and in France October 9, 1928.

The present invention has for its object an apparatus for converting stationary headlights into rotatable headlights by enabling them to rotate about a vertical axis passing through the illuminant.

The said apparatus is essentially characterized by the fact that the shank of the usual headlight is mounted on a bearing brass which is rotatable in a casing secured to the headlight bracket pertaining to the vehicle, which bearing brass is also subjected to a variable braking action.

In the accompanying drawings and by way of example:

Figure 1:
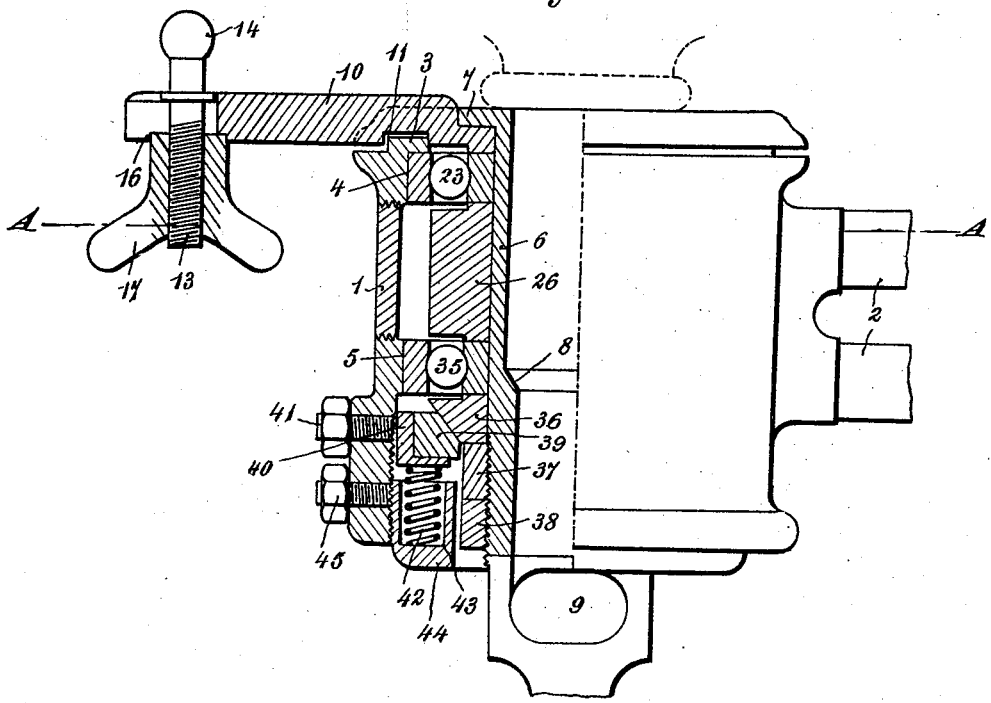
Fig. 1 represents one-half in elevation and one-half in vertical section, a constructional form of the apparatus according to the invention.
Figure 2:
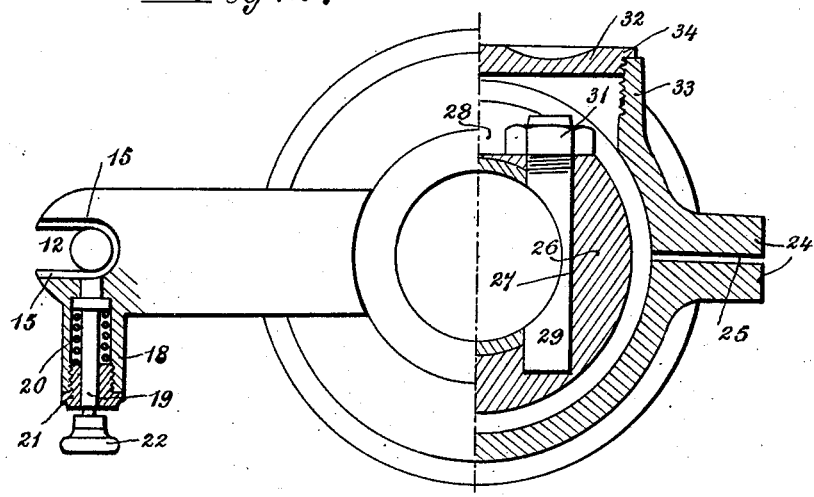
Fig. 2 shows the same apparatus, one-half in plan view and one-half in horizontal section on a plane passing through A—A of Figure 1.

The apparatus in conformity to the invention consists essentially of a cylindrical casing 1 which is open at both ends; said casing comprises at the exterior suitable securing means (two lugs 2) by which it may be mounted on the bracket of the vehicle. On the said case are further provided external bosses whose object will be further explained.

The edge of the upper aperture of the case 1 is bordered by a circular shoulder or contact portion 3, and in its bore are mounted two contact surfaces 4—5 for ball-bearings. The lower end of the said bore is screwthreaded. In the said casing 1, which forms a bearing, the brass carrying the shank of the headlight is rotatable on its vertical axis.

The said brass consists of a cylindrical socket 6 having at the top an external flange 7. Said socket 6 comprises a tapered internal shoulder 8, and at the exterior of the casing 1 it has an aperture 9 for the passage of the electric wires leading to the headlight. On said socket 6 are disposed the following parts, specified in the order of their assembling.

The lower side of the flange of the socket 7 is in contact with the annular central part, forming a cover, of a lever 10. In the lower face of this central part is an annular groove 11 cooperating with a corresponding rib provided on the cooperating face of the casing 1, and this combination forms a joint cover.

In the outer end of the lever 10 is a slot 12 serving as a fork, into which extends the threaded rod 13 of a ball member 14; this latter is held against rotation by two parallel flat places formed on the lower part of said ball member 14, and said flat places cooperate with grooves 15 formed in one face of said fork and which are parallel with the sides of the slot 12. On the other face of the fork is a concave part 16 in which is engaged the notched base of a nut 17 screwing upon the threaded rod 13 of the ball member 14. Said nut is provided with wings for its rotation.

At the side of the arm 10 is a cylindrical boss 18 whose axis is perpendicular to the axis of the ball rod 14, which axes are in a common plane perpendicular to the fork 12. In the bore of the said boss is an elastic push-piece 19 whose inner end, under the action of a spring 20, may engage the notches of the nut 17, thus holding it against rotation. The spring 20 is in contact with the plug 21, and the push-piece 19 may be drawn out by acting upon the knob 22 at its end.

The ball 14, thus controlled, may receive one end of a coupling bar connecting the two headlights of a vehicle, or other device imparting the motion.

The central annular part of the lever 10 rests upon the internal ring (or race) of a set of balls 23; the outer ring (or race) for the same is mounted in the upper bearing member 4 of the casing 1 in such manner as to support it below its projection 3. The ball-bearing can be held against straight motion by a set screw or by a bolt entering the two wings 24, pertaining to said casing 1; said wings 24 are separated by a slot 25 formed in the wall of this latter.

The inner ring of the ball-bearing rests upon a sleeve 26, keyed to a central socket 6, and to this effect the sleeve 26 is provided, in a plane perpendicular to its axis and outside this latter, with a keyway or recess 27, which also extends into the wall of said axial socket 6. A cut out portion 28 is formed on the outer face of the sleeve 26, thus forming a contact surface perpendicular to the axis of the cylindrical keyway used for the round key 29; in the latter is a round notch or recess 30 whose radius corresponds to that of the internal bore of the socket 6.

In these conditions, the key 29 being in position and the shank of the headlight being inserted into the socket 6, it is simply necessary to screw the nut 31 upon the threaded part of said key 29 in order that the latter will hold together the said shank, the socket 6, and the outer sleeve 26 of the latter. Access may be had to the said nut 31 through the wall of the casing 1, by means of an aperture in the boss 33, which is normally closed by a screw plug 34.

The sleeve 26 rests upon the inner ring of a ball-bearing 35, the outer ring being engaged with the second contact surface 5 of said casing 1.

Below the ball-bearing 35 is provided a friction cone 36 whose apex is downwardly situated; said cone 36 is secured to the central socket 6 by a key or the like. A nut 37 and a lock nut 38 hold the said cone 36 upon the socket 6.

The outer surface of the friction cone 36 rests upon a braking washer 39 having a tapered surface, and said washer (of fibre, ferrodo or the like) is contained in a ring 40 having an L-section (or other) which serves as a metallic frame, and the said frame 40 is held in place by a screw 41 mounted in one of the bosses of the casing 1.

In contact with the inner face of the latter are the elastic elements which regulate the braking pressure and these may consist of spiral springs 42 disposed in recesses 43 having vertical axes, formed in a screw pressure ring 44; said ring is screwed into the lower tapped bore of the casing 1, and according to its position, it exercises by means of the springs 42 a greater or less pressure upon the tapered friction surfaces of the elements 36—39; the element 36 is stationary, since it pertains to the casing 1, whereas the element 39, being secured to the headlight-carrying socket 6, is rotatable. The ring 44 is held in its adjusted position by a screw 45 traversing a lateral boss of the casing 1.

Due to the adjustable automatic braking of the rotation of the socket 6, this arrangement obviates all vibration of the illuminant or its device which may be caused by the steering action.

In a modified construction, the ball bearing 35 can be eliminated, and herein the tapered friction member 36, secured to said socket 6, may be replaced by a tapered surface formed directly upon the said sleeve 26.

I claim:

1. A support for a headlight which comprises a stationary part, a rotary part carried by and arranged in said stationary part, ball bearings interposed between said parts, means associated with the rotary part for attaching the headlight, and means for actuating said rotary part, additional means both for keeping said rotary part in place and for absorbing shocks, a lever firmly connected to said rotary part, said lever comprising a removable ball member provided with two projecting flat faces, a nut for adjusting the ball member, said lever also having a recess and a groove to carry the ball member whereby said flat faces engage the said groove to keep the ball member in place and means holding the ball member immovable which comprise a pin and elastic means which engage said pin with the nut immobilizing the latter so that the ball member is rendered immovable and any movement transmitted thereto is imparted to the headlight.

2. A support for a headlight which comprises a stationary part, a rotary part carried by and arranged in said stationary part, ball bearings interposed between said parts, means associated with the rotary part for attaching the headlight, and means for actuating said rotary part, additional means both for keeping said rotary part in place and for absorbing shocks, said means for absorbing shocks and for keeping the rotary part in place comprises a conical ring firmly secured to the stationary part, another conical ring contacting with the first ring and rotatable with the rotary part and vertically movable, a support for said rotary ring, elastic means acting on said support to keep the rings constantly in engagement so that a braking action is exercised when the rings are displaced by shocks.

3. A support for a headlight which comprises a stationary part, a rotary part carried by and arranged in said stationary part, ball bearings interposed between said parts, means associated with the rotary part for attaching the headlight, and means for actuating said rotary part, additional means both for keeping said rotary part in place and for absorbing shocks, said means for attaching the headlight comprise a stationary member having a cut-out portion, a rotary member consisting of a hollow cylinder provided with a bore, a key fitting in said bore and having a cut-out portion corresponding to the inner cut-out portion of the cylinder, said key being introduced in said bore through the cut-out portion of the stationary part, a nut adapted to be screwed upon said key, a bracket carrying the headlight adapted for insertion into said hollow cylinder whereby the headlight is firmly connected to the rotary cylinder when said key and nut are fixed.

In testimony whereof I affix my signature.

ALPHONSE CHABROL.